A. ANDERSON.
ELLIPSO-PANTAGRAPH.

No. 184,493. Patented Nov. 21, 1876.

WITNESSES:
Frances E. Clark
John Smith Jr.

INVENTOR:
Allan Anderson

UNITED STATES PATENT OFFICE.

ALBAN ANDERSON, OF PEEKSKILL, NEW YORK.

IMPROVEMENT IN ELLIPSO-PANTOGRAPHS.

Specification forming part of Letters Patent No. 184,493, dated November 21, 1876; application filed April 20, 1876.

*To all whom it may concern:*

Be it known that I, ALBAN ANDERSON, of Peekskill, New York, have invented an instrument that may properly be called an "Ellipso-Pantograph," as it is really a combination of an ellipsograph and a pantograph, of which the following is a specification:

This invention is of the nature of the pantograph or instrument for making enlarged or reduced copies of a drawing or form, but differs from the pantograph in that, while the latter enlarges or reduces always in the same proportion as the original, this instrument will, by proper adjustment, enlarge or reduce in such proportion or disproportion as may be desired; and, consequently, ellipses of any proportion may be produced from a circle, or a whole series of patterns—as shoe-patterns, for instance—may be produced and properly proportioned from a single diagram or pattern; and many other operations of a similar nature may be much facilitated by this instrument.

Figure 1:
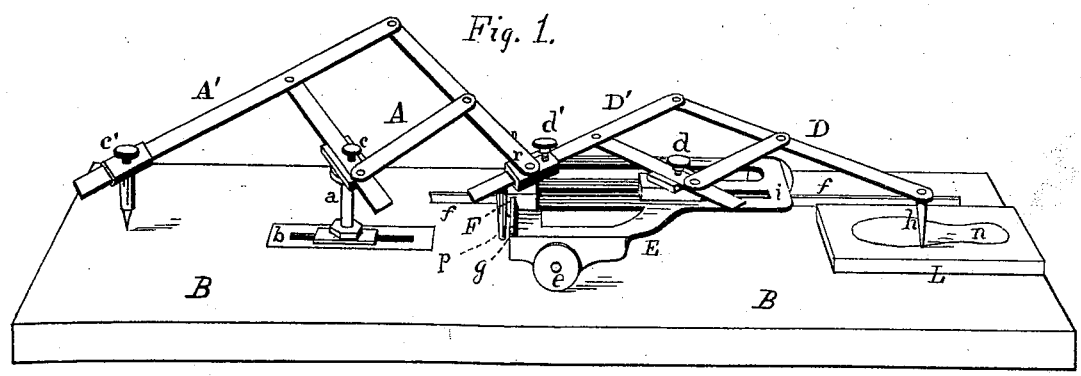
Figure 2:
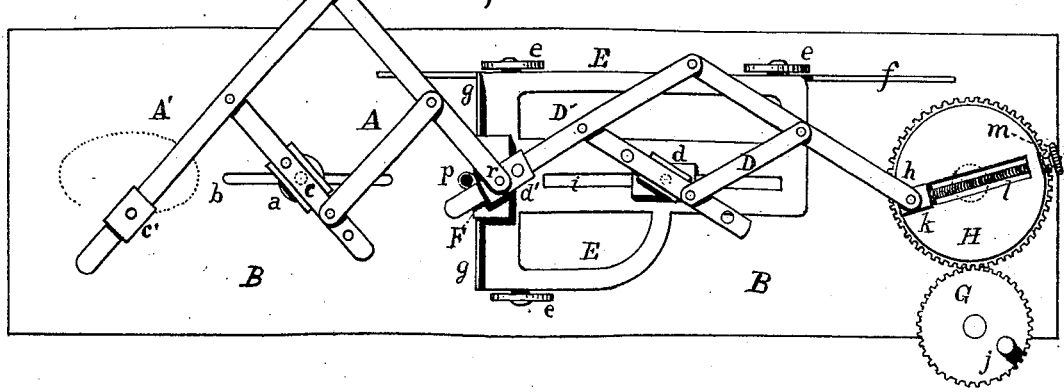

In the drawings, Figure 1 is a perspective view of an instrument embodying my invention. Fig. 2 is a plan of the same.

A A is an ordinary pantograph supported and swinging on the adjustable stud $a$, which may be moved longitudinally in the slot $b$ in the base of the instrument B. D D is another pantograph supported on the carriage E E, and having its central pivot $d$ adjustable in the slot $i$ in the carriage. The carriage is mounted on rollers or wheels $e\ e\ e$, that it may have freedom of movement; and, as it should have a perfect rectilineal movement, the wheels may run in grooves or on rails, or a single rail, as $f f$, attached to the base B, with projections on the carriage that embrace it will answer. The slots $i$ and $b$ should be exactly in line with each other, and the rail $f$ should be parallel with them, or a line joining them. At one end of the carriage E is a rail or guide, $g\ g$, placed at a right angle with the line joining the slots $b$ and $i$. Fitted to and freely sliding on this rail or guide is the block F. Pivoted to this block at $r$ is the sleeve $d'$, through which the bar D' of the pantograph D' D passes, the latter being held in place by a screw in the sleeve.

The object of the guide $g$ is to insure a parallel movement of the carriage and tracing-point by compelling the carriage E to move whenever the tracing-point $h$ deviates from a course which is at right angles with the axis or line joining the centers $d$ and $c$ or the slots $b$ and $i$, though while the course of $h$ is at right angles with the axis, or, what is the same, parallel with the guide $g$, it may move through its whole limit transversely, and the carriage will remain stationary. Any device which will insure the parallel movement obtained by the rail or guide $g$ will answer equally well.

I do not confine myself to the carriage E for supporting and giving a rectilineal movement to the pantograph D' D, as it is apparent that any device insuring parallel movement may be substituted with the same result.

At the outer end of the pantograph D' D is the tracing-point $h$. The diagram or pattern, as $n$, to be copied is placed on the removable board L. If the pantograph A A' be removed and a pencil be placed in the tube attached to the block F for that purpose, the principle of the instrument may be more easily understood. If the pantograph D' D is now adjusted, so that the points $r$, $d$, and $h$ are equidistant, the pencil $p$ will exactly reproduce the design or pattern $n$. If the point $d$ is adjusted so as to be nearer to $r$ than to $h$, the tracing will still be of the same length as the pattern, but narrower—as much narrower than the pattern as the distance between $r$ and $d$ is less than between $d$ and $h$. And if the point $d$ is nearer than the point $r$ to $h$, the tracing at $p$ will be wider than the pattern, but of the same length still; so, as a consequence of the two parallel motions, one of the carriage and one of the guide $g$, the reproduced design will, in the direction of the axis of the instrument, always be of the same length as the pattern, though it may vary to any extent in its width or transverse section, according to the adjustment of point $d$.

The office of the additional pantograph A A is to enlarge or reduce the figure that is produced at $r$, which is done by proper adjustments of the points $c'$ and $c$ and stud $a$.

Fig. 2 shows an attachment for facilitating the production of ellipses, &c. It consists of a disk, H, revolving on a pin inserted in the base B, the pin being on the line joining the centers of the pantograph. The disk has a diametrical slot, in which travels the block $k$, which is capable of being moved to or from the center of the disk by the screw $l$. In the block $k$ is a hole to receive the tracing-point $h$ of the pantograph $D'$ $D$. The disk H may be grooved and revolved by a cord passing around it and around the wheel G, which is also grooved; or both wheels may be toothed and geared together, as shown in drawing. The wheel G is turned by the crank-pin $j$.

With this arrangement, or similar devices, ellipses, or other figures which may be derived from a circle, can be produced with great facility, and either at the point $p$ or at $c'$. The slots $i$ and $b$, and other adjustable points, may be divided into scales varying in different instruments according to the purposes for which which they were designed.

I claim—

1. The pantograph D, in combination with the devices for insuring the parallel movements, substantially as described, the one insuring a rectilineal movement of the center $d$, and the other insuring a rectilineal and parallel movement of the extremities $r$ and $h$ of the pantograph, said movements being at right angles to each other, substantially as and for the purposes hereinbefore set forth.

2. In combination with the pantograph $D'$ D, the carriage E, for supporting said pantograph, and the guides $f\,f$ and $g\,g$ for insuring the proper movement to carriage and to the block F, substantially as and for the purposes herein set forth.

3. In combination with the pantograph $D'$ D, as above described, the supplementary pantograph A A, for enlarging or reducing the figures produced by the pantograph D, substantially as specified.

4. A pantograph and any form of ellipsograph, combined and operating conjointly, to produce either proportionate or disproportionate enlargements or reductions of any figure or pattern, substantially as set forth.

ALBAN ANDERSON.

Witnesses:
F. E. CLARK,
JOHN SMITH, Jr.